(12) United States Patent
Yoon

(10) Patent No.: US 11,619,825 B2
(45) Date of Patent: Apr. 4, 2023

(54) METHOD AND APPARATUS FOR DISPLAYING BINOCULAR HOLOGRAM IMAGE

(71) Applicant: ELECTRONICS AND TELECOMMUNICATIONS RESEARCH INSTITUTE, Daejeon (KR)

(72) Inventor: Min-Sung Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 363 days.

(21) Appl. No.: 16/844,711

(22) Filed: Apr. 9, 2020

(65) Prior Publication Data

US 2020/0326554 A1 Oct. 15, 2020

(30) Foreign Application Priority Data

Apr. 10, 2019 (KR) .................... 10-2019-0041773
Mar. 16, 2020 (KR) .................... 10-2020-0031935

(51) Int. Cl.
*G02B 27/10* (2006.01)
*G03H 1/22* (2006.01)
(Continued)

(52) U.S. Cl.
CPC ............ *G02B 27/1066* (2013.01); *G02B 5/32* (2013.01); *G02B 27/106* (2013.01);
(Continued)

(58) Field of Classification Search
CPC ........ G03H 1/268; G03H 1/02; G03H 1/2205; G03H 1/2294; G03H 2001/0212;
(Continued)

(56) References Cited

U.S. PATENT DOCUMENTS 8,681,184 B2 * 3/2014 Seesselberg ....... G02B 27/0172
348/57
9,250,373 B2 * 2/2016 Kubota .................. G02B 27/44
(Continued)

FOREIGN PATENT DOCUMENTS

CN 107065178 A * 8/2017 ......... G02B 27/0172
JP 2016541031 A 12/2016
(Continued)

OTHER PUBLICATIONS

Hoon Song et al., "Holographic Display with a FPD-based Complex Spatial Light Modulator," Proceedings of SPIE—The International Society for Optical Engineering, Feb. 2014, vol. 8977.
(Continued)

*Primary Examiner* — Jade R Chwasz

(57) ABSTRACT

A method displays a binocular hologram image. The method includes generating a light beam of an incident wave field having coherence, expanding the generated light beam to the size of the active area of a display, converging the expanded light beam on the respective positions of the eyes of a user, generating digital hologram content, and displaying a hologram image based on the converged light beam and on the digital hologram content.

18 Claims, 13 Drawing Sheets

(51) Int. Cl.
*G02B 5/32* (2006.01)
*G02B 27/30* (2006.01)
*G02B 30/22* (2020.01)
*G03H 1/02* (2006.01)

(52) U.S. Cl.
CPC ......... *G02B 27/1093* (2013.01); *G02B 27/30* (2013.01); *G02B 30/22* (2020.01); *G03H 1/02* (2013.01); *G03H 1/2205* (2013.01); *G03H 1/2294* (2013.01); *G03H 2001/0212* (2013.01); G03H 2001/0216 (2013.01); G03H 2001/2234 (2013.01); *G03H 2222/12* (2013.01); *G03H 2223/23* (2013.01); *G03H 2223/24* (2013.01); *G03H 2225/31* (2013.01); *G03H 2225/52* (2013.01); *G03H 2227/06* (2013.01); *G03H 2260/12* (2013.01)

(58) Field of Classification Search
CPC ... G03H 2001/0216; G03H 2001/2234; G03H 2222/12; G03H 2223/23; G03H 2223/24; G03H 2225/31; G03H 2225/52; G03H 2227/06; G03H 2260/12; G03H 2225/60; G02B 2027/0134; G02B 2027/0174; G02B 2027/0178; G02B 27/0172; G02B 27/1066; G02B 5/32; G02B 27/106; G02B 27/1093; G02B 27/30; G02B 30/22
See application file for complete search history.

(56) References Cited

U.S. PATENT DOCUMENTS

| | | | |
|---|---|---|---|
| 10,432,920 | B2 | 10/2019 | Benitez et al. |
| 10,593,092 | B2 * | 3/2020 | Solomon ............ G02B 27/0176 |
| 10,845,761 | B2 * | 11/2020 | Maimone ........... G02B 27/0172 |
| 2008/0231805 | A1 | 9/2008 | Schwerdtner |
| 2013/0242555 | A1 * | 9/2013 | Mukawa ............ G02B 27/0172 |
| | | | 362/237 |
| 2016/0147003 | A1 * | 5/2016 | Morozov ............... G02B 27/10 |
| | | | 362/613 |
| 2019/0072899 | A1 | 3/2019 | Kim |
| 2019/0204783 | A1 | 7/2019 | Kim |

FOREIGN PATENT DOCUMENTS

| | | |
|---|---|---|
| KR | 20170083865 A | 7/2017 |
| KR | 20190105458 A | 9/2019 |
| WO | WO0231405 A2 | 4/2002 |

OTHER PUBLICATIONS

Jungkwuen An et al., "Binocular Holographic Display with Pupil Space Division Method," SID 2015 Digest, May 21-Jun. 5, 2015, pp. 522-525. vol. 46, Issue 1, San Jose, CA.

* cited by examiner

METHOD AND APPARATUS FOR DISPLAYING BINOCULAR HOLOGRAM IMAGE

CROSS REFERENCE TO RELATED APPLICATIONS

This application claims the benefit of Korean Patent Application No. 10-2019-0041773, filed Apr. 10, 2019, and No. 10-2020-0031935, filed Mar. 16, 2020, which are hereby incorporated by reference in their entireties into this application.

BACKGROUND OF THE INVENTION

1. Technical Field

The present invention relates generally to technology for reproducing a binocular holographic stereoscopic image, and more particularly to technology for reproducing digital hologram content in a mobile head-mounted binocular holographic display apparatus.

2. Description of the Related Art

Holographic display technology, which is ideal and realistic three-dimensional (3D) display technology, reproduces a wavefront generated on a given object without change, thereby having an effect of making the object appear to a person's eyes as if it really existed. Particularly, unlike a stereoscopic method based on binocular disparity, which is mainly used in the current 3D display industry, holographic display technology does not have a problem of inconsistency between accommodation and convergence. Accordingly, eye fatigue and discomfort are not caused, different images may be observed naturally from different viewpoints, and multiple viewers are able to view images without additional devices for viewing (e.g., glasses). Therefore, holographic display technology is regarded as the ultimate 3D display technology.

Accordingly, research on display elements and new display systems in which a currently available display element is combined with optical and mechanical systems are actively being conducted in many countries. However, there are several requirements for implementing holographic display technology. First, an image having a wide viewing angle is required, and to this end, a display element, the pixel pitch of which approximates the wavelength of visible light (e.g., equal to or less than 1 μm), is required. Also, a sufficiently large holographic image must be able to be reproduced, in which case the display area of a spatial light modulator to be used must have an active area having a size equal to or greater than a certain size (e.g., two inches). However, this tiling structure may cause a problem in which the joint boundary lines thereof emerge as black lines even in a reproduced hologram image, so the quality of the reproduced hologram image may be degraded.

Meanwhile, because the size of a holographic image and the range of a viewing angle that can be represented using only a currently available display element are very small, it is not easy to actually observe the characteristics of a holographic display as an ideal 3D display (e.g., motion parallax, consistency between accommodation and convergence, and binocular disparity). Accordingly, various attempts to overcome these limitations by combining a display element with additional optical and mechanical control systems have been made. However, such systems occupy a large area and require a process for optically precise arrangement. Also, even when a holographic display system is actually implemented, it has a disadvantage in that it is difficult to move the system due to the bulky system structure thereof. Furthermore, a holographic display commonly uses an illumination light source having coherence, such as a laser, and it is dangerous to view such illumination light with the naked eye for a long time. Therefore, in order to prepare an optimum image, it may be necessary to indirectly observe and view images by capturing them using a camera in many cases. Accordingly, coherent light having sufficient intensity must be radiated uniformly to the active area of a spatial light modulator in which a hologram image is encoded.

In addition to an optical system based on beam division and beam path control functions for an image guide capable of providing and maintaining coherence, a near-eye holographic image reproduction terminal system needs to be made as thin and light as possible. Furthermore, a mobile head-mounted binocular holographic display should be designed such that a user comfortably view images, and in order for such a system, capable of reproducing a stereoscopic image, to appear natural to the eyes of a user, it is necessary to provide digital hologram content suitable for the system.

Documents of Related Art (Patent Document 1) Korean Patent Application Publication No. 10-2017-0083865, published on Jul. 19, 2017 and titled "Holographic display device with wide viewing angle".

SUMMARY OF THE INVENTION

An object of the present invention is to implement a terminal system equipped with a small and lightweight head-mounted display device for displaying a holographic image.

Another object of the present invention is to provide a user with a full-color hologram image reproduced in 3D space through a small and lightweight wearable hologram image guide such that the user is able to conveniently view the image.

A further object of the present invention is to provide a coherent plane wavefront for a spatial light modulator (SLM) that generates a stereoscopic image in an augmented-reality (AR)-type holographic display terminal.

Yet another object of the present invention is to enable straight and parallel light beams to be output from a device for providing a surface light source having coherence toward a spatial light modulator and to provide a transmissive beam deflector and beam divider for generating and controlling a surface light source in a linearly polarized state.

In order to accomplish the above objects, a method for displaying a binocular hologram image according to an embodiment of the present invention may include generating a light beam of an incident wave field having coherence; expanding the generated light beam to the size of the active area of a display; converging the expanded light beam on the respective positions of the eyes of a user; generating digital hologram content; and displaying a hologram image based on the converged light beam and on the digital hologram content.

Here, expanding the generated light beam may be configured to expand the generated light beam so as to have the characteristics of a plane wave field.

Here, expanding the generated light beam may be configured to expand the generated light beam so as to have uniform light intensity.

Here, converging the expanded light beam may include dividing the expanded light beam into two light beams; and deflecting the two light beams in left and right directions, respectively.

Here, dividing the expanded light beam may be configured to pass the expanded light beam through a beam-dividing diffraction grating, which is a transmissive diffraction grating pattern obtained through periodic refractive index modulation, thereby dividing the expanded light beam.

Here, deflecting the two light beams may be configured to pass the two light beams through two respective beam-deflecting diffraction gratings, which are transmissive diffraction grating patterns obtained through periodic refractive index modulation, thereby deflecting the two light beams.

Here, generating the digital hologram content may be configured to generate the digital hologram content encoded so as to be suitable for a user terminal.

Here, when the hologram image is displayed, the displayed hologram image may be formed of a pair of images in consideration of binocular parallax.

Here, when the hologram image is displayed, the displayed hologram image may be a hologram image that supports the binocular characteristics of a near-eye head-mounted display.

Here, when the hologram image is displayed, the displayed hologram image may be provided so as to be viewed through the left and right eyes of the user at a specific position and a specific angle selected by the user.

Also, an apparatus for displaying a binocular hologram image according to an embodiment of the present invention may include a light source unit for generating a light beam of an incident wave field having coherence; an expansion unit for expanding the generated light beam to the size of the active area of a display; a convergence unit for converging the expanded light beam on the respective positions of the eyes of a user; a content generation unit for generating digital hologram content; and an image display unit for displaying a hologram image based on the converged light beam and on the digital hologram content.

Here, the expansion unit may expand the generated light beam so as to have the characteristics of a plane wave field.

Here, the expansion unit may expand the generated light beam so as to have uniform light intensity.

Here, the convergence unit may converge the expanded light beam by passing the expanded light beam through a beam-deflecting diffraction grating in which a member capable of converging a beam is included.

Here, the convergence unit may converge the expanded light beam by making the expanded light beam sequentially pass through a beam-deflecting diffraction grating and a convergent lens.

Here, the beam-deflecting diffraction grating may be a transmissive diffraction grating pattern obtained through periodic refractive index modulation.

Here, the image display unit may display the hologram image by encoding the digital hologram content so as to be suitable for a user terminal.

Here, the hologram image displayed by the image display unit may be formed of a pair of images in consideration of binocular parallax.

Here, the hologram image displayed by the image display unit may be a hologram image that supports the binocular characteristics of a near-eye head-mounted display.

Here, the hologram image displayed by the image display unit may be provided so as to be viewed through the left and right eyes of the user at a specific position and a specific angle selected by the user.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Figure 1:
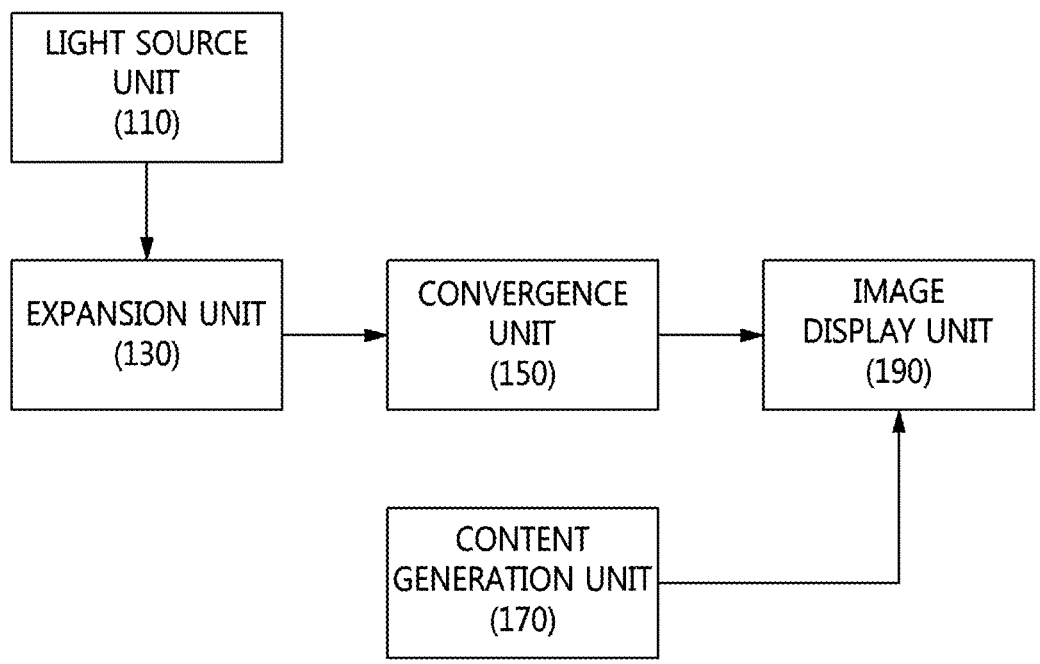
FIG. 1 is a block diagram illustrating an apparatus for displaying a binocular hologram image according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains.

Accordingly, the shapes, sizes, etc. of components in the drawings may be exaggerated in order to make the description clearer.

Hereinafter, a preferred embodiment of the present invention will be described in detail with reference to the accompanying drawings.

1. Operation Principle Of Light Wave Path Control

FIG. 1 is a block diagram illustrating an apparatus for displaying a binocular hologram image according to an embodiment of the present invention.

Referring to FIG. 1, the apparatus for displaying a binocular hologram image according to the present embodiment includes a light source unit 110, an expansion unit 130, a convergence unit 150, a content generation unit 170, and an image display unit 190.

The light source unit 110 generates a light beam having the characteristics of an incident wave field having coherence.

The expansion unit 130 expands the light beam generated by the light source unit 110 to the size of the active area of a display. Here, the expansion unit 130 may expand the generated light beam so as to have the characteristics of a plane wave field. Also, the expansion unit 130 may expand the generated light beam so as to have uniform light intensity.

The convergence unit 150 converges the light beam expanded by the expansion unit 130 on the respective positions of the eyes of a user. Here, the convergence unit 150 passes the light beam, expanded by the expansion unit 130, through a beam-deflecting diffraction grating including a member capable of converging a beam, thereby converging the light beam. Alternatively, the convergence unit 150 makes the light beam, expanded by the expansion unit 130, sequentially pass through a beam-deflecting diffraction grating and a convergent lens, thereby converging the light beam. Here, the beam-deflecting diffraction grating may be a transmissive diffraction grating pattern obtained through periodic refractive index modulation. Here, the convergence unit 150 may appropriately design a focusing length such that light converges on observation positions at which the eyes of a user are located.

The content generation unit 170 generates digital hologram content. Here, the content generation unit 170 may encode the digital hologram content so as to be suitable for a user terminal.

The image display unit 190 displays a hologram image based on the light beam converged by the convergence unit 150 and on the digital hologram content generated by the content generation unit 170. Here, the hologram image displayed by the image display unit 190 may be formed of a pair of images in consideration of binocular parallax. Here, the hologram image displayed by the image display unit 190 may be a hologram image that supports the binocular characteristics of a near-eye head-mounted display. Here, the hologram image displayed by the image display unit 190 may be provided so as to be viewed through the left and right eyes of a user at a specific position and a specific angle selected by the user.

Although not illustrated in the drawing, the apparatus for displaying a binocular hologram image according to the present embodiment may include a light concentration unit between the light source unit 110 and the expansion unit 130. The light concentration unit collimates the light beam generated by the light source unit 110 and converts the same into a wave field having a plane wavefront having discriminable directivity. Also, the light concentration unit converts the light beam generated by the light source unit 110 into illumination light having spatially uniform intensity.

Figure 2:
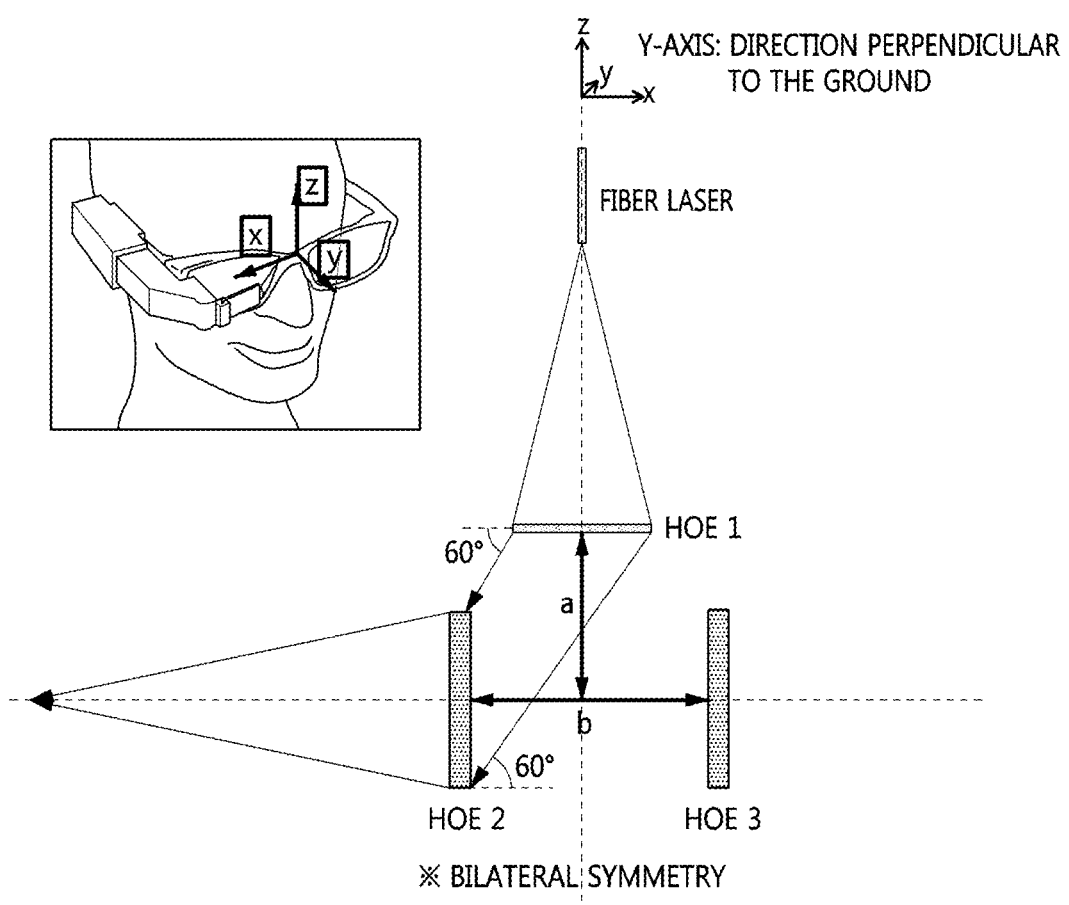
FIG. 2 is a concept diagram of a head-mounted binocular holographic terminal in which an apparatus for displaying a binocular hologram image is implemented according to an embodiment of the present invention.

FIG. 2 illustrates an example of a head-mounted binocular holographic terminal in which the apparatus for displaying a binocular hologram image according to the embodiment of FIG. 1 is implemented. Referring to FIG. 2, the apparatus for displaying a binocular hologram image according to the embodiment of FIG. 1 may be provided in the form of a Head-Mounted Display (HMD).

2. Design Of The Structure Of A Head-Mounted Binocular Terminal

Figure 3:
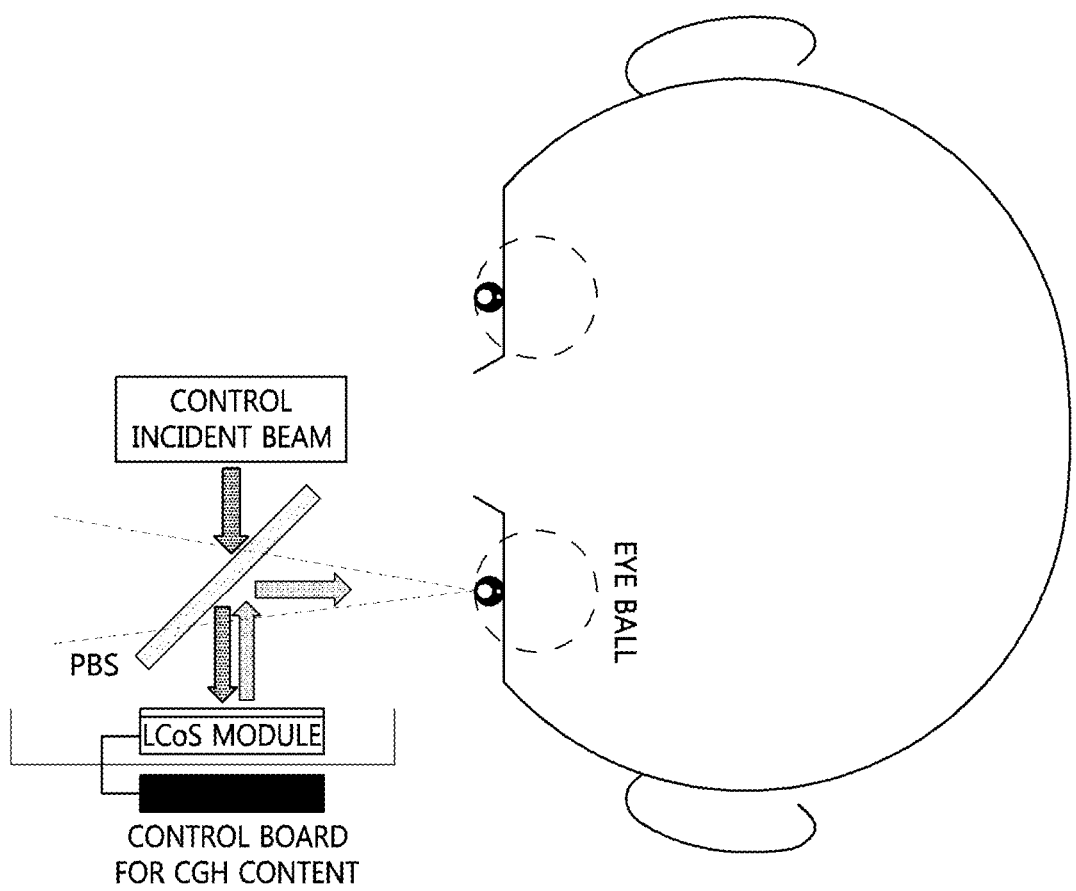
FIG. 3 illustrates the general structure of a coherent illumination optical system including a light wavefront path deflector and divider based on a diffraction grating for a binocular holographic panel according to an embodiment of the present invention.

FIG. 3 illustrates an example in which incident light is output by passing through an illumination optical system (a coherent BLU) according to an embodiment of the present invention. Here, light incident to the illumination optical system may be a light beam generated by the light source unit 110 according to the embodiment of FIG. 1. Referring to FIG. 3, the illumination optical system according to the present embodiment is configured such that the input beam (of light) is a divergent beam and the finally output beam (of light) has the characteristics of a convergent beam (of light). That is, because the illumination optical system according to the present embodiment has both a beam expansion function and a beam convergence function, the illumination optical system according to the present embodiment may substitute for the expansion unit 130 and the convergence unit 150 in the embodiment of FIG. 1. Here, the illumination optical system may include a beam divider and a beam deflector, which are based on a diffraction grating for a binocular holographic panel. The beam divider divides incident light into two light beams on left and right sides, and the beam deflector diffracts the left and right light beams resulting from division of the incident light. Here, the illumination optical system including the beam divider and the beam deflector may perform the functions of the expansion unit 130 and the convergence unit 150 in the embodiment of FIG. 1.

Incident light is divided into two beams on left and right sides when it passes through the beam divider, and the left and right beams, which are divided when the incident light passes through the beam divider, are received and guided by two different beam deflectors and are then radiated to a Spatial Light Modulator (SLM) panel unit on the left side and an SLM panel unit on the right side. Here, each of the left SLM panel unit and the right SLM panel unit may use any one of a reflective SLM and a transmissive SLM. It is desirable for the left SLM panel unit and the right SLM panel unit to use a reflective SLM.

When the illumination optical system according to the present embodiment is placed so as to satisfy the beam split angle (±θ) for the optimum beam divider, the distance between two focal points by two convergent lenses may be designed to match the average distance between a person's two eyes (that is, W=6.5 cm).

Figure 4:
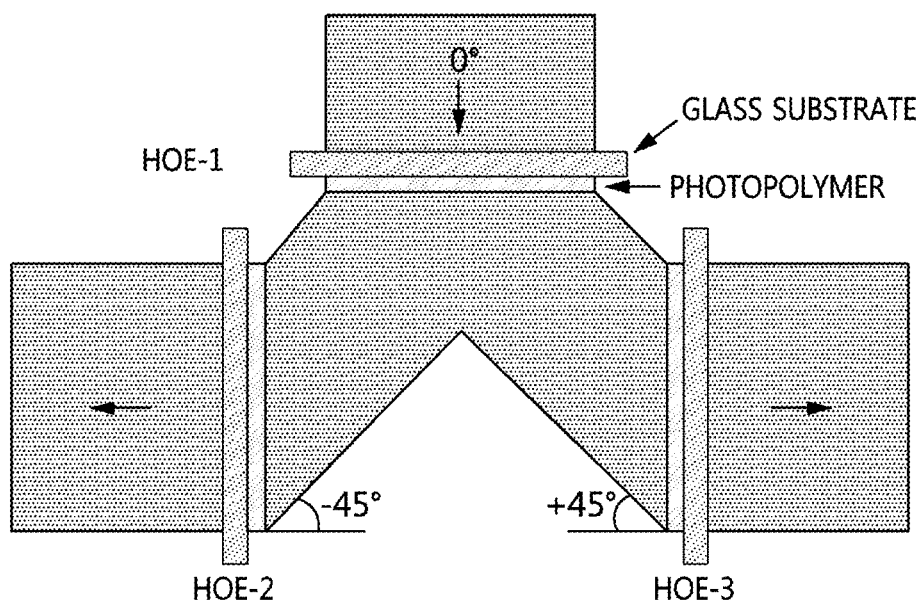
FIG. 4 illustrates the general structure of a beam path deflector and a beam divider for a binocular holographic panel according to another embodiment of the present invention.
Figure 6:
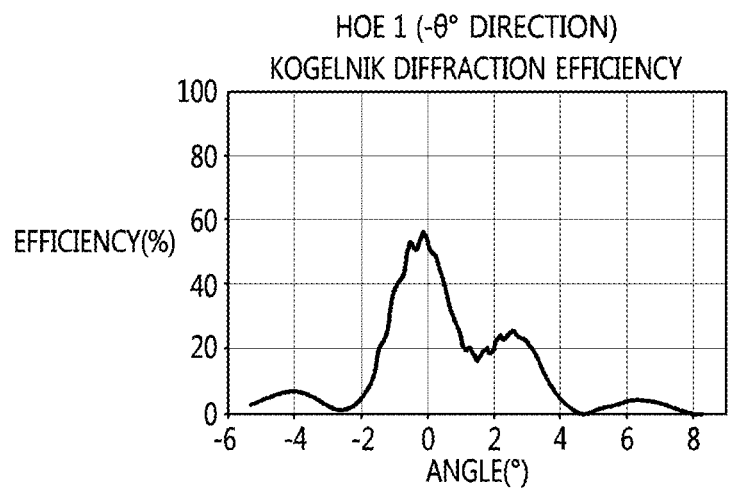
FIGS. 6 to 9 illustrate the diffraction characteristic curves of a flat-panel-type beam divider HOE-1, a left beam deflector HOE-2, and a right beam deflector HOE-3 based on a holographic optical element (HOE) according to an embodiment of the present invention.
Figure 7:
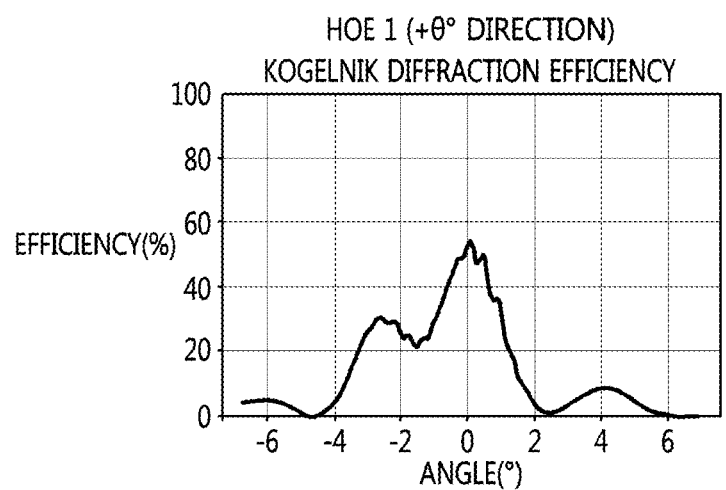
Figure 8:
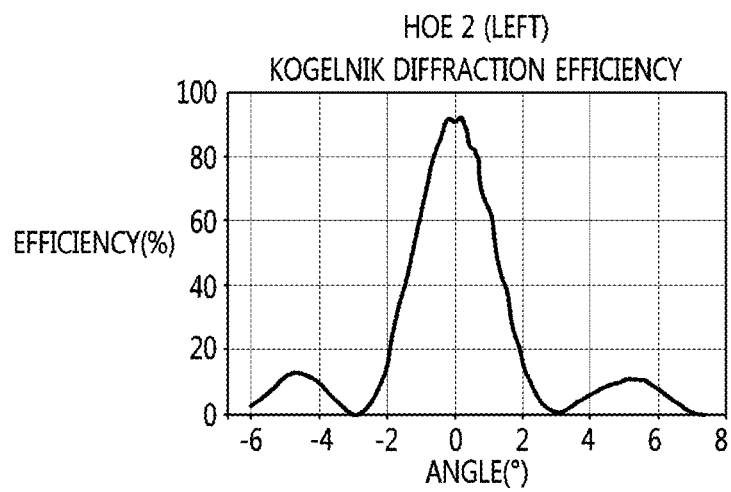
Figure 9:
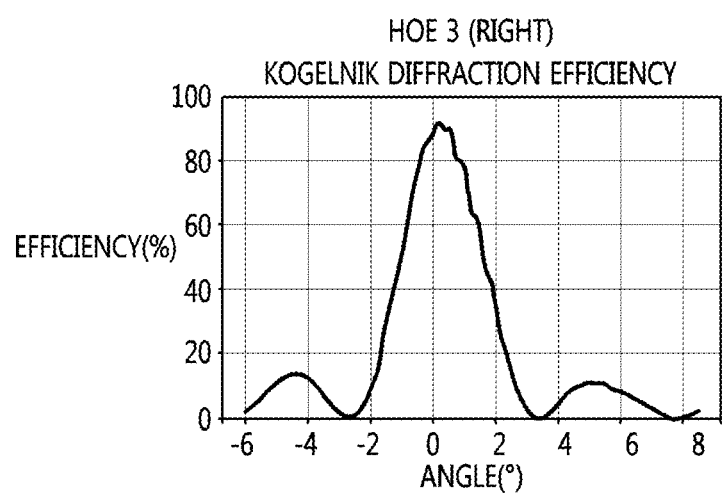

FIG. 4 illustrates an example in which incident light is output by passing through a flat-panel-type beam divider HOE-1 and beam deflectors HOE-2 and HOE-3 according to an embodiment of the present invention, and FIGS. 6 to 9 illustrate the diffraction characteristic curves of the beam divider HOE-1, the left beam reflector HOE-2, and the right beam reflector HOE-3 according to the embodiment of FIG. 4. Here, light incident to the beam divider and the beam deflectors may be a light beam generated by the light source unit 110 according to the embodiment of FIG. 1. Referring to FIGS. 6 and 7, the maximum efficiency of each beam output from the beam divider is equal to or greater than 54%, and, referring to FIGS. 8 and 9, the maximum efficiency of the beam output from each of the beam deflectors is equal to or greater than 90%. Here, it is desirable that the two beams, formed by the beam divider HOE-1 so as to travel in the directions of ±θ degrees, be output with the same diffraction efficiency. Also, it is desirable that the left and right beam deflectors HOE-2 and HOE-3 output light with the same diffraction efficiency.

3. Design Of Diffraction Grating

Referring again to FIG. 1, the convergence unit 150 may include a diffraction grating. This diffraction grating may be made of a material exhibiting periodic refractive index modulation.

Figure 5:
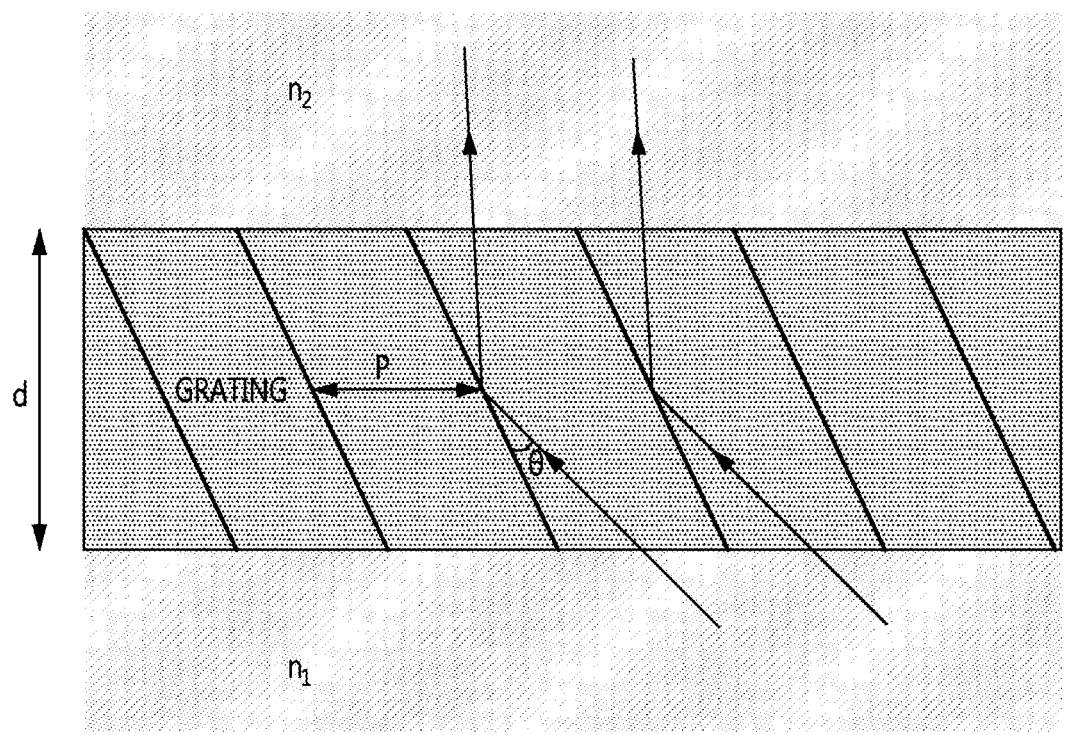
FIG. 5 illustrates the geometrical structure of a transmissive diffraction grating by periodic refractive index modulation.

FIG. 5 illustrates the geometrical structure of a transmissive diffraction grating by periodic refractive index modulation. Referring to FIG. 5, an incident angle $\theta_1$ and a transmission angle $\theta_2$ relative to a normal line to the surface of a diffraction grating, the pitch of which is P, are represented as $\theta=\theta_1=\theta_2$ according to the law of reflection. When the refractive index of this diffraction grating is n, the refractive index of the medium below the grating and the refractive index of the medium above the grating generally have different values, indicated by $n_1$ and $n_2$, respectively.

The direction in which light passing through the transmissive diffraction grating travels may be represented using the relationship $$\sin\theta = \frac{\lambda}{2P}$$

under the Bragg grating diffraction condition. Here, it is assumed to be $n=n_1=n_2$. Accordingly, in the transmissive diffraction grating, transmission light may be controlled so as to travel in a desired direction by designing the diffraction grating in consideration of the incidence angle, the orientation of the grating, the grating spacing of the diffraction grating, and the like. Also, when the transmissive diffraction grating based on a variable refractive index has a sufficient thickness (d) of about 10 μm, it has excellent efficiency of diffraction of the transmission light and provides high angular selectivity, that is, low angular divergence. Therefore, according to a preferred embodiment of the present invention, it is desirable that the transmissive diffraction grating use a flat crossed-lens-type transmissive diffraction grating, which is based on a holographic optical element (HOE) method in a holographic recording medium and on a periodic refractive index modulation characteristic such that optimum diffraction efficiency and high angular selectivity are provided to the output light. Also, the transmissive diffraction grating using surface relief characteristics, which are acquired through a digital micropattern recording process, may be produced using a diffractive optical element (DOE) method.

1. Display Process For Generation Of Binocular Holographic Content And Image Reconstruction Referring again to FIG. 1, the content generation unit 170 generates digital hologram content, and the image display unit 190 displays a hologram image based on the light beam converged by the convergence unit 150 and on the digital hologram content generated by the content generation unit 170.

Figure 10:
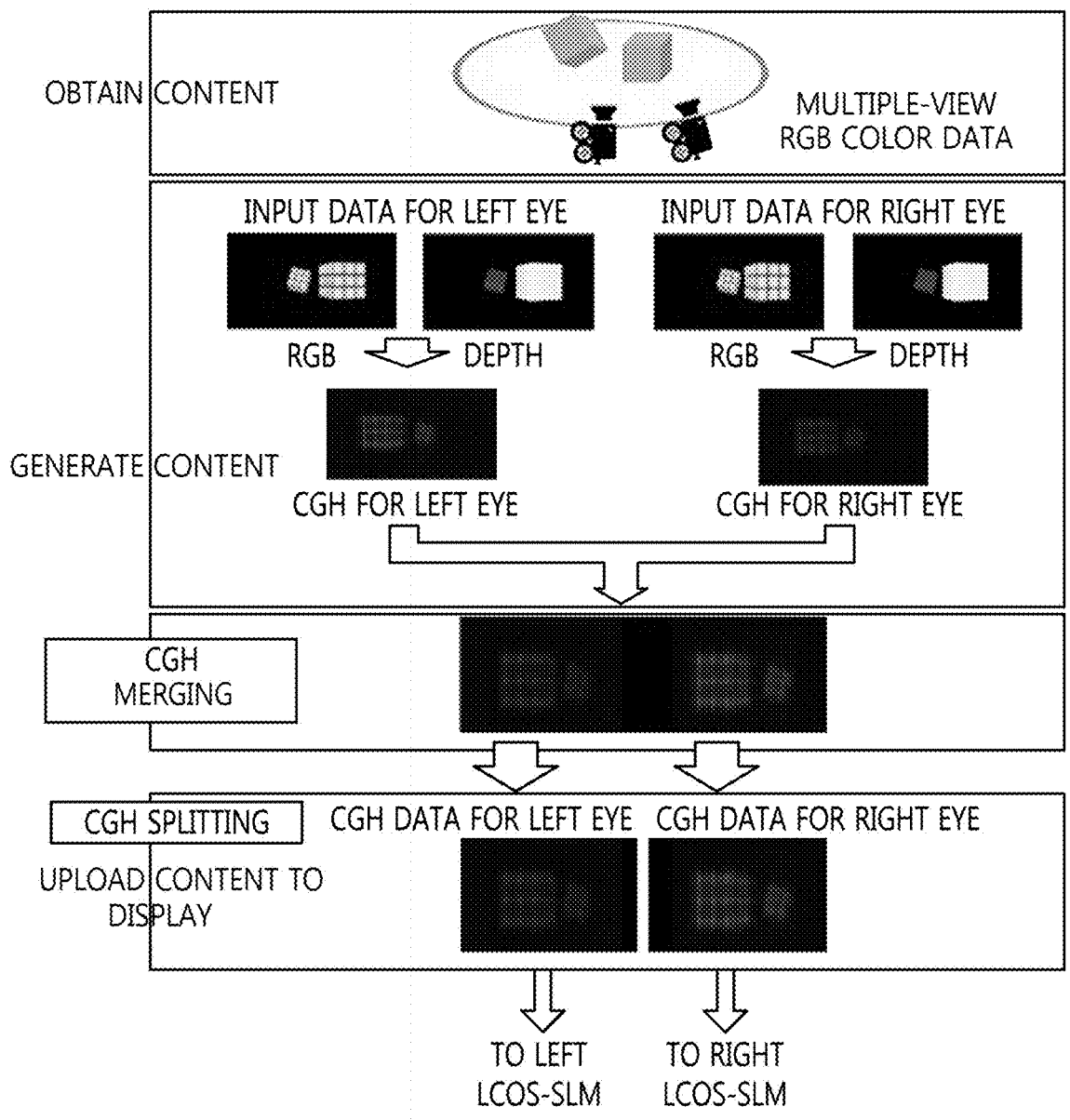
FIG. 10 schematically illustrates the process of generating and displaying binocular holographic content according to an embodiment of the present invention.

FIG. 10 schematically illustrates the process of generating and displaying binocular holographic content according to an embodiment of the present invention.

The content generation unit 170 acquires image content in which binocular parallax is taken into consideration and generates a computer-generated hologram (CGH) file based on the image content. Here, the image content may be RGB-depth map data. The content generation unit 170 performs an operation based on a Fast Fourier Transform (FFT) algorithm for a set of RGB-depth map data corresponding to the left and right eyes, thereby obtaining two CGHs for the left and right eyes. Here, the original CGH data configured with complex numbers may be encoded so as to be suitable for a foldable display that is used (an amplitude-modulation-type or phase-modulation-type spatial light modulator or the like). Also, the encoded two CGH files for the left and right eyes may be merged to become a single file. In this merging process, the CGH files for the left and right eyes may be merged such that they are horizontally arranged side by side. As the result, the merged CGH is prepared to be uploaded to the given foldable terminal. Here, the CGH in the form of a moving image file may be prepared by arranging the images, acquired from a set of images that are alternately merged, according to a proper sequence. When the prepared CGH files are uploaded to the selected terminal, time synchronization between illumination light beams may be supported such that a holographic image in 3D space is reconstructed in the foldable terminal.

The image display unit 190 displays the hologram image based on the light beam converged by the convergence unit 150 and on the digital hologram content generated by the content generation unit 170. The image display unit 190 may be a foldable terminal.

Figure 11:
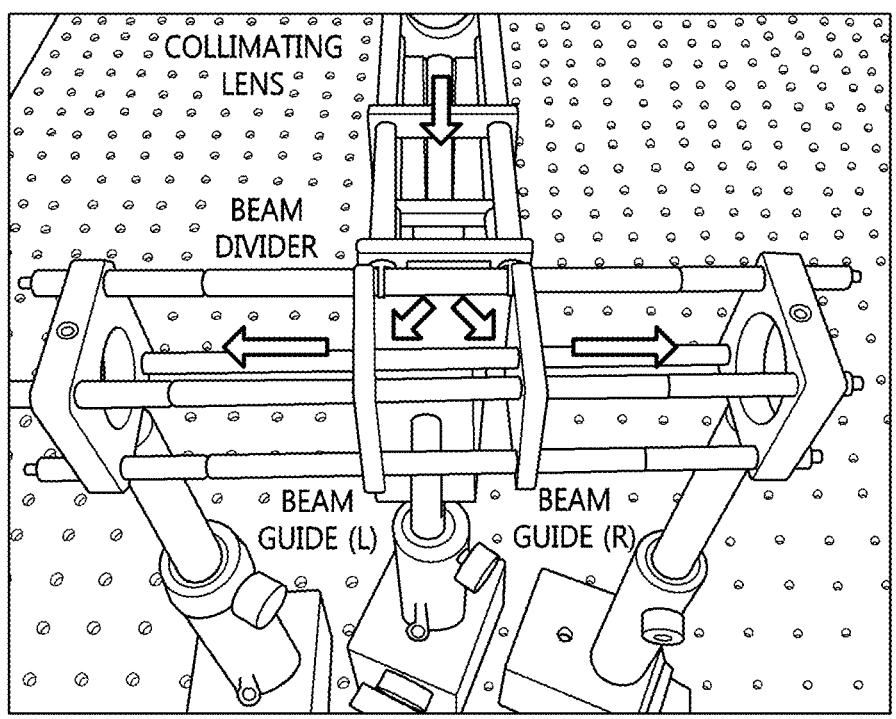
FIG. 11 illustrates the path along which a beam travels in an optical system including a beam divider and a beam guide produced as holographic optical elements (HOE) according to an embodiment of the present invention.

FIG. 11 illustrates the path along which a beam travels in an optical system including a beam divider and a beam guide produced as holographic optical elements (HOE) according to an embodiment of the present invention. Referring to FIG. 11, light generated from a collimating lens is divided by a beam divider so as to travel along two paths on left and right sides, and the light beams divided so as to travel along the two paths may be guided by respective beam guides on the left and right sides.

Figure 12:
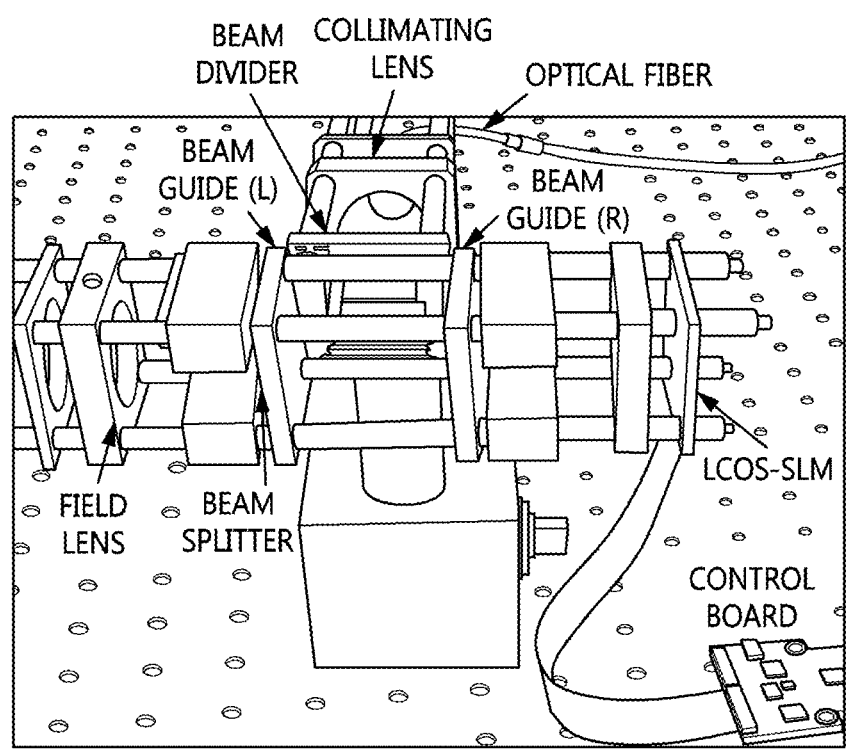
FIG. 12 is a perspective view illustrating an optical system including a beam divider and a beam guide produced as HOEs according to an embodiment of the present invention.

FIG. 12 is a perspective view illustrating an optical system including a beam divider and a beam guide produced as holographic optical elements (HOE) according to an embodiment of the present invention. Referring to FIG. 12, it may be confirmed that the optical system according to the present embodiment includes a collimating lens, a beam divider, and a beam guide.

Figure 13:
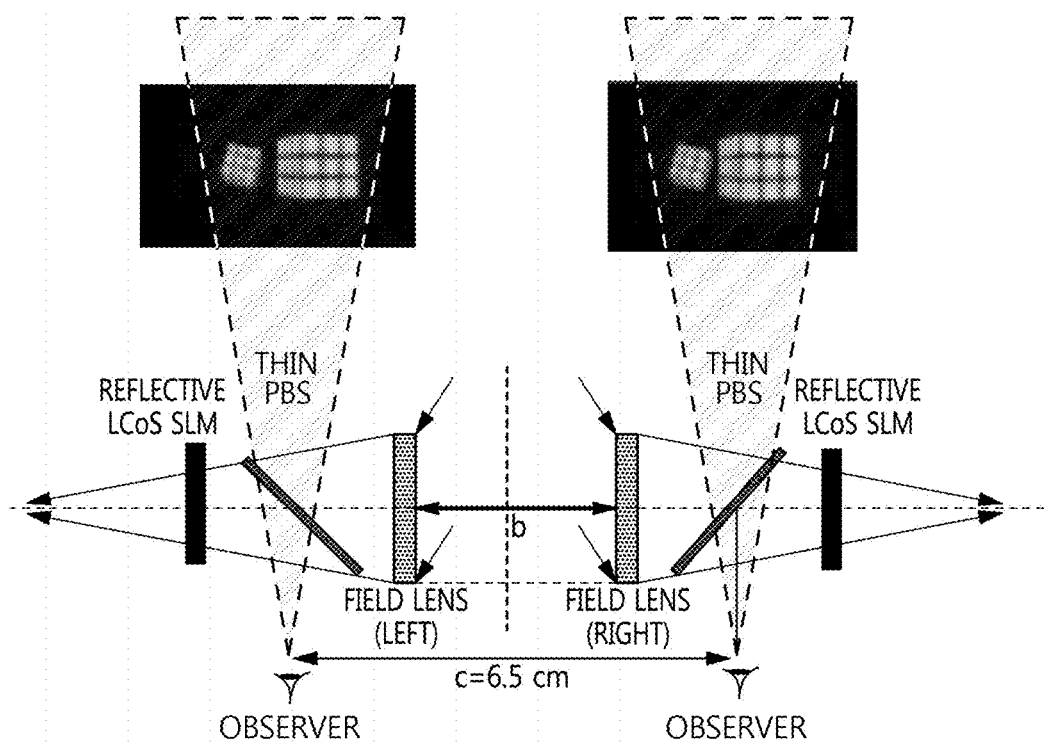
FIG. 13 is a top plan view of an optical system including a beam divider and a beam guide produced as HOEs according to an embodiment of the present invention.

FIG. 13 is a top plan view of an optical system including a beam divider and a beam guide produced as HOEs according to an embodiment of the present invention. According to the embodiment of FIG. 13, it may be confirmed that the optical system according to the present invention is designed such that the distance between two focal points is 6.5 cm, which is the average distance between a person's two eyes.

Figure 14:
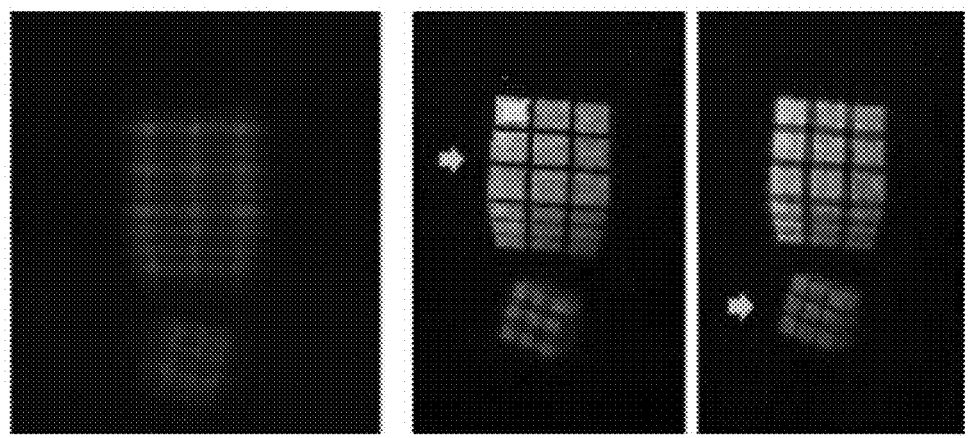
FIG. 14 illustrates a experimental result of optical hologram reconstruction through a reflective Liquid-Crystal-on-Silicon (LCOS) Spatial Light Modulator (SLM)

FIG. 14 illustrates a experimental result of optical hologram reconstruction through a reflective LCOS-SLM. In FIG. 14, the image on the left side represents the input amplitude-modulation-type computer-generated hologram CGH, and the two images on the right side represent holographic 3D images reconstructed for the left and right eyes. Referring to FIG. 14, it may be confirmed that the input amplitude-modulation-type CGH is reconstructed so as to have an accommodation effect such that the difference between the actual spatial depths of two objects is perceived, which is the characteristic of a reconstructed holographic 3D image.

Figure 15:
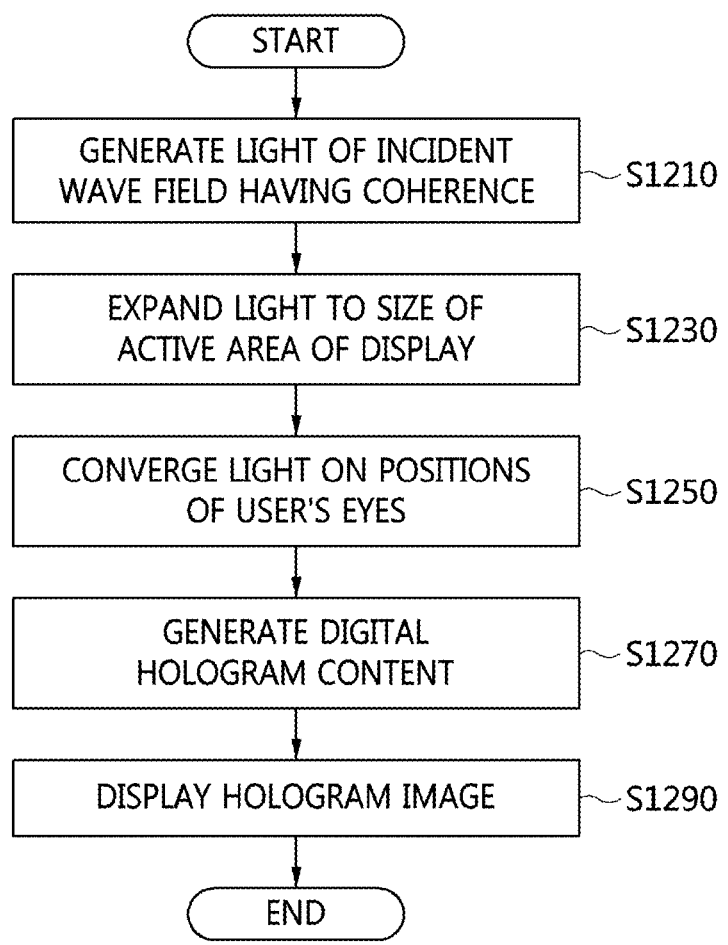
FIGS. 15 to 16 are flowcharts illustrating a method for displaying a binocular hologram image according to an embodiment of the present invention.
Figure 16:
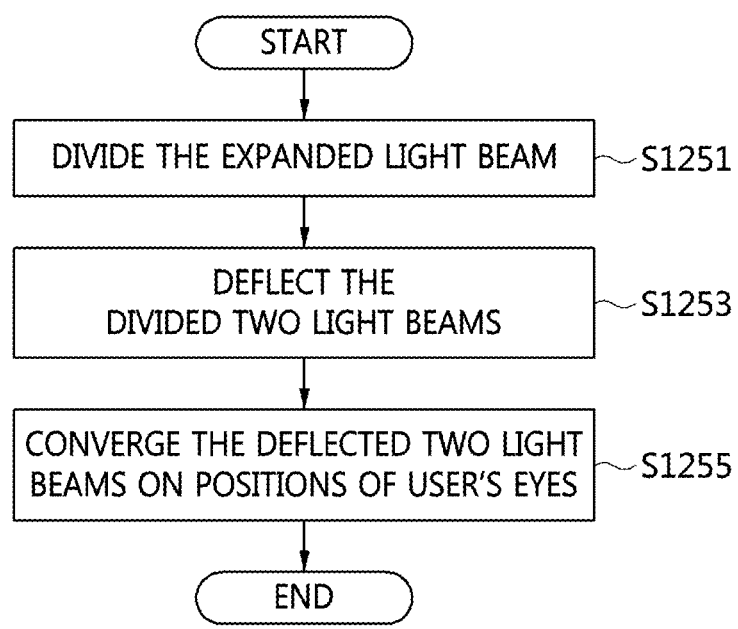

FIGS. 15 to 16 are flowcharts illustrating a method for displaying a binocular hologram image according to an embodiment of the present invention.

Referring to FIG. 15, in the method for displaying a binocular hologram image according to an embodiment of the present invention, a light beam of an incident wave field having coherence is generated at step S1210.

Also, in the method for displaying a binocular hologram image according to an embodiment of the present invention, the generated light beam is expanded to the size of the active area of a display at step S1230.

Here, the generated light beam may be expanded so as to have the characteristics of a plane wave field.

Here, the generated light beam may be expanded so as to have uniform light intensity.

Also, in the method for displaying a binocular hologram image according to an embodiment of the present invention, the expanded light beam is converged on the respective positions of the eyes of a user at step S1250.

Here, the light beam expanded at step S1230 is made to pass through a beam-deflecting diffraction grating including a member capable of converging a beam, whereby the light beam may be converged.

Here, the light beam expanded at step S1230 is made to sequentially pass through a beam-deflecting diffraction grating and a convergent lens, whereby the light beam may be converged.

Here, referring to FIG. 16, converging the expanded light beam may include dividing the expanded light beam into two light beams at step S1251, deflecting the two light beams in left and right directions, respectively, at step S1253 and converging the deflected two light beams on the respective positions of the eyes of a user at step S1255. Here, dividing the expanded light beam at step S1251 may be configured to pass the expanded light beam through a beam-dividing diffraction grating, which is a transmissive diffraction grating pattern obtained through periodic refractive index modulation, thereby dividing the expanded light beam. Also, deflecting the two light beams at step S1253 may be configured to pass the two light beams through two respective beam-deflecting diffraction gratings, which are transmissive diffraction grating patterns obtained through periodic refractive index modulation, thereby deflecting the two light beams.

Also, in the method for displaying a binocular hologram image according to an embodiment of the present invention, digital hologram content is generated at step S1270.

Here, the generated digital hologram content may be encoded so as to be suitable for a user terminal.

Also, in the method for displaying a binocular hologram image according to an embodiment of the present invention, a hologram image is displayed based on the converged light beam and on the digital hologram content at step S1290.

Here, the displayed hologram image may be formed of a pair of images in consideration of binocular parallax.

Here, the displayed hologram image may be a hologram image that supports the binocular characteristics of a near-eye head-mounted display.

Here, the displayed hologram image may be provided so as to be viewed through the left and right eyes of the user at a specific position and a specific angle, which are selected by the user.

According to the present invention, it is possible to implement a head-mounted binocular holographic display system through which a complete stereoscopic image can be viewed, such as an augmented-reality (AR)-type hologram terminal.

Also, it is possible to implement a mobile binocular stereoscopic holographic system for providing a suitable viewing angle such that a reconstructed image can be comfortably viewed even though a conventional flat-panel-type holographic terminal is used.

As described above, the apparatus and method for displaying a binocular hologram image according to the present invention are not limitedly applied to the configurations and operations of the above-described embodiments, but all or some of the embodiments may be selectively combined and configured, so that the embodiments may be modified in various ways.

What is claimed is:

1. A method for displaying a binocular hologram image, comprising:
   generating a light beam of an incident wave field having coherence;
   expanding the generated light beam to a size of an active area of a display;
   converging the expanded light beam on respective positions of left and right eyes of a user;
   generating digital hologram content; and
   displaying a hologram image based on the converged light beam and on the digital hologram content,
   wherein generating the digital hologram content comprises encoding two computer-generated holograms (CGHs) for the left and right eyes which are suitable for a foldable display, and
   wherein converging the expanded light beam comprises:
   dividing the expanded light beam into two light beams; and
   deflecting the two light beams in left and right directions, respectively,
   wherein the two deflected light beams are radiated to a Spatial Light Modulator (SLM) panel unit on the left side and an SLM panel unit on the right side.

2. The method of claim 1, wherein expanding the generated light beam is configured to expand the generated light beam so as to have characteristics of a plane wave field.

3. The method of claim 1, wherein expanding the generated light beam is configured to expand the generated light beam so as to have uniform light intensity.

4. The method of claim 1, wherein dividing the expanded light beam is configured to pass the expanded light beam through a beam-dividing diffraction grating, which is a transmissive diffraction grating pattern obtained through periodic refractive index modulation, thereby dividing the expanded light beam,
   wherein the beam-dividing diffraction grating uses a flat crossed-lens-type transmissive diffraction grating, which is based on a holographic optical element (HOE) method.

5. The method of claim 1, wherein deflecting the two light beams is configured to pass the two light beams through two respective beam-deflecting diffraction gratings, which are transmissive diffraction grating patterns obtained through periodic refractive index modulation, thereby deflecting the two light beams.

6. The method of claim 1, wherein generating the digital hologram content is configured to generate the digital hologram content encoded so as to be suitable for a user terminal.

7. The method of claim 1, wherein, when the hologram image is displayed, the displayed hologram image is formed of a pair of images in consideration of binocular parallax.

8. The method of claim 1, wherein, when the hologram image is displayed, the displayed hologram image is a hologram image that supports binocular characteristics of a near-eye head-mounted display.

9. The method of claim 1, wherein, when the hologram image is displayed, the displayed hologram image is provided so as to be viewed through left and right eyes of the user at a specific position and a specific angle selected by the user.

10. An apparatus for displaying a binocular hologram image, comprising:
- a light source unit for generating a light beam of an incident wave field having coherence;
- an expansion unit for expanding the generated light beam to a size of an active area of a display;
- a convergence unit for converging the expanded light beam on respective positions of left and right eyes of a user;
- a content generation unit for generating digital hologram content; and
- an image display unit for displaying a hologram image based on the converged light beam and on the digital hologram content,
- wherein generating the digital hologram content comprises encoding two computer-generated holograms (CGHs) for the left and right eyes which are suitable for a foldable display,
- wherein the convergence unit converges the expanded light beam by passing the expanded light beam through a beam-deflecting diffraction grating in which a member capable of converging a beam is included, and
- wherein the expanded light beam is deflected into two light beams in left and right directions and the two deflected light beams are radiated to a Spatial Light Modulator (SLM) panel unit on the left side and an SLM panel unit on the right side.

11. The apparatus of claim 10, wherein the expansion unit expands the generated light beam so as to have characteristics of a plane wave field.

12. The apparatus of claim 10, wherein the expansion unit expands the generated light beam so as to have uniform light intensity.

13. The apparatus of claim 10, wherein the convergence unit converges the expanded light beam by making the expanded light beam sequentially pass through the beam-deflecting diffraction grating and a convergent lens.

14. The apparatus of claim 13, wherein the beam-deflecting diffraction grating is a transmissive diffraction grating pattern obtained through periodic refractive index modulation and uses a flat crossed-lens-type transmissive diffraction grating, which is based on a holographic optical element (HOE) method.

15. The apparatus of claim 10, wherein the content generation unit generates the digital hologram content encoded so as to be suitable for a user terminal.

16. The apparatus of claim 10, wherein the hologram image displayed by the image display unit is formed of a pair of images in consideration of binocular parallax.

17. The apparatus of claim 10, wherein the hologram image displayed by the image display unit is a hologram image that supports binocular characteristics of a near-eye head-mounted display.

18. The apparatus of claim 10, wherein the hologram image displayed by the image display unit is provided so as to be viewed through left and right eyes of the user at a specific position and a specific angle selected by the user.

* * * * *